Nov. 4, 1952   C. H. NESBITT ET AL   2,616,775
ADJUSTABLE TRAY FOR VEHICLE INSTRUMENT PANELS
Filed July 5, 1950   2 SHEETS—SHEET 1
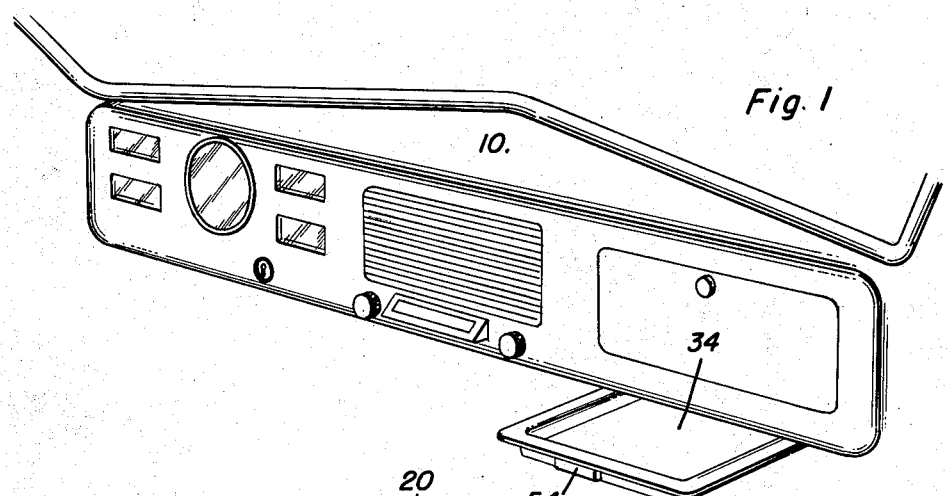
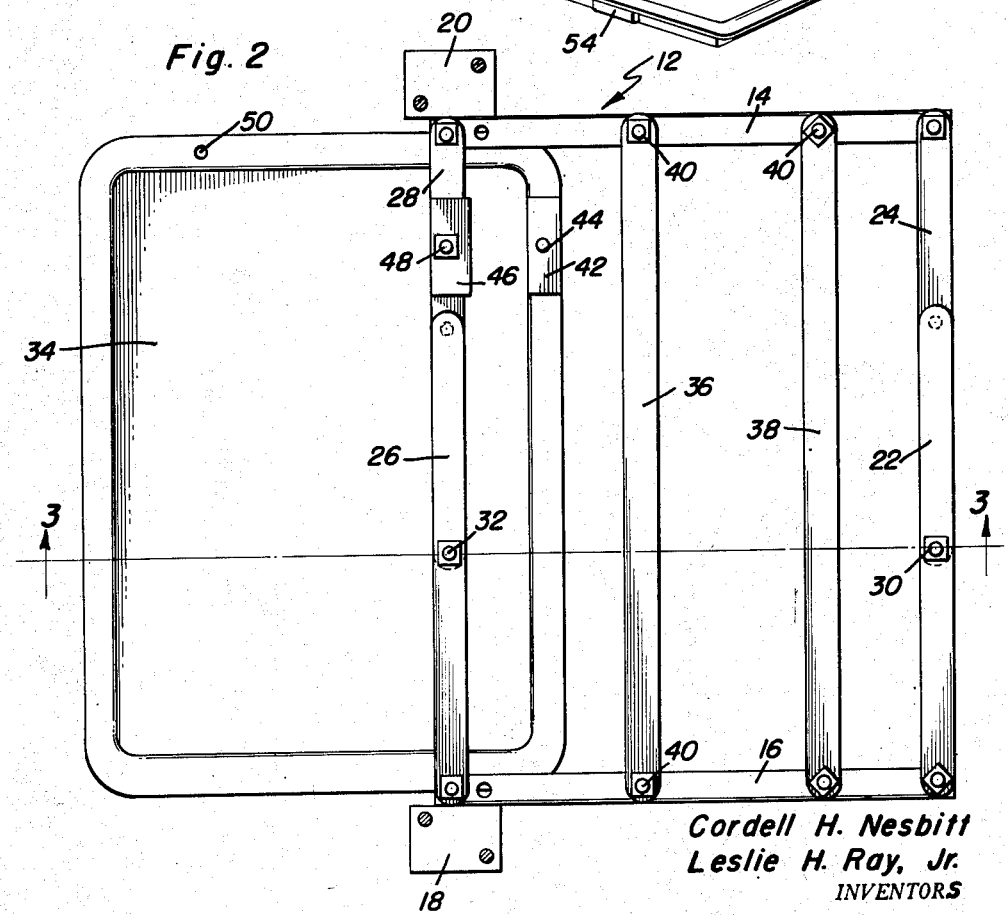
Cordell H. Nesbitt
Leslie H. Ray, Jr.
INVENTORS

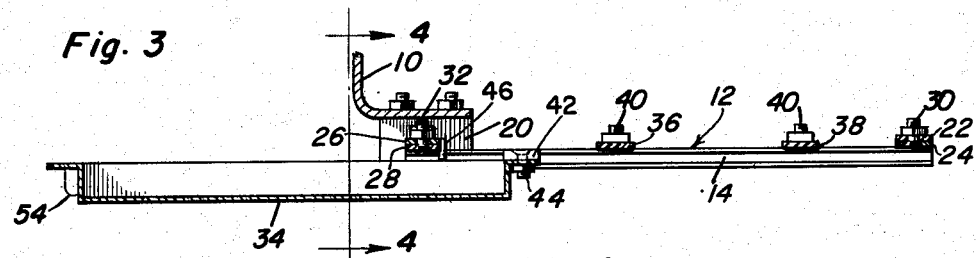

Patented Nov. 4, 1952

2,616,775

UNITED STATES PATENT OFFICE 2,616,775

ADJUSTABLE TRAY FOR VEHICLE INSTRUMENT PANELS

Cordell H. Nesbitt, Nashville, and Leslie H. Ray, Jr., Madison, Tenn.

Application July 5, 1950, Serial No. 172,096

4 Claims. (Cl. 311—21)

This invention relates to convertible, adjustable and detachable receding tray structure which is adapted to be mounted in the interior of an automotive vehicle in a manner to serve as a convenient support for dishes, tumblers and the like when partaking of a meal or refreshments at drive-in restaurants or during outings, and which tray structure is adapted to be selectively secured beneath the instrument panel of various types of automobiles.

An object of this invention is to provide an improved tray and support structure wherein the tray is slidably mounted and which may be readily and quickly mounted beneath the instrument panel of an automobile and which, when retracted and not in use, will be out of the way and relatively inconspicuous.

Still another object of the invention resides in the provision of a tray structure which is constructed in such a manner that the tray, which is rectangular, may be secured beneath the instrument panel of the vehicle in such a manner as to either allow the longer or shorter sides of the tray to extend transversely of the vehicle depending on the existing space and other requirements.

Still further objects of the instant invention reside in the provision of a tray structure that is strong, durable, highly efficient in operation, simple in construction and manufacture, capable of being easily installed beneath the instrument panel of an automobile, and which is relatively inexpensive to manufacture.

These, together with the various ancillary objects of the invention which will become apparent as the following description proceeds, are attained by this tray structure, a preferred embodiment of which has been illustrated in the accompanying drawings, by way of example only, wherein:

Figure 1 is a perspective view showing the tray in operative emplacement beneath the instrument panel of an automotive vehicle;

Figure 2 is a top plan view showing the tray structure in one arrangement with the tray having its longer side extending transversely of the automotive vehicle;

Figure 3 is a sectional view taken along line 3—3 in Figure 2;

Figure 4 is a sectional view taken along line 4—4 in Figure 3;

Figure 5 is a top plan view of the tray structure comprising the present invention shown emplaced beneath the instrument panel of an automobile with the shorter side of the rectangular tray extending transversely of the vehicle; and Figure 6 is a sectional detail taken on the line 6—6 of Figure 5.

With continuing reference to the accompanying drawings, wherein like reference numerals designate like parts throughout the various views, the reference numeral 10 generally designates an instrument panel of an automotive vehicle such as a passenger car or the like on which the tray structure, generally indicated by the reference numeral 12, is adapted to be mounted.

The framework or support structure comprises a pair of channel-shaped guide members 14 and 16 which are secured by means of angle-shaped brackets 18 and 20 beneath the instrument panel 10 of the vehicle. The brackets are secured to the instrument panel by means of suitable bolts.

With reference now to Figure 2, in particular, it will be seen that the framework or support structure is characterized in a first form by the paired links 22 and 24 on the one hand and 26 and 28 on the other hand extending in substantially parallel relationship. Each of the links is provided with an aperture adjacent the ends thereof and an aperture in the center so that the links may be overlapped and respectively bolted together as at 30 and 32 in order to form the extensions when it is desired to mount the tray 34 with its longer side extending transversely of the automobile. Other single brace members 36 and 38 are provided and these brace members are secured by bolts 40 to the guide members 14 and 16 respectively. The brace members 36 and 38 extend in spaced parallel relationship with each other and with the aforementioned links when the tray is positioned with its longer side as shown in Figure 2. There is secured on the rim of tray 34 a stop block 42 by means of a bolt 44 passing through bolt hole 52 and which is adapted to engage the angle iron stop member 46 on the link 28 which is held by means of the bolt 48.

Formed in the rim of the tray 34 is a selectively usable bolt hole 50 (Fig. 2) through which the bolt 44 can extend to hold the block 42 in place when it is desired to use the tray in the position as shown in Figure 5. The bolt 44 is readily loosened and the block changed to the position as shown, leaving the bolt hole 52 readily available. When the invention is adjusted in this manner (Fig. 5), the braces 36 and 38 are arranged in crisscross relationship relative to each other and the links 22 and 24 and 26 and 28 are secured to the guide members 12 and 14 in overlying relationship, forming a double brace with the bolts 30 and 32 extending through the aligned central apertures in each of the links.

Pull members such as the one indicated at 54 are secured to the respective sides and ends of the tray 34 so as to enable the tray to be easily pulled from without the guide members 14 and 16 no matter which position the over-all tray structure occupies beneath the instrument panel.

Since, from the foregoing, the construction and advantages of this vehicle serving tray are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. An adjustable tray structure for an automotive vehicle comprising a pair of channel guide members, bracket members secured to guide members for securing said tray structure beneath the instrument panel of the automotive vehicle, a pair of brace members terminally attached to said guide members and extending therebetween, a stop member on one of said brace members, a tray slidably received and carried by said guide members, a stop member carried by said tray for engagement with the stop member on said brace member when said tray is in an extended position, each of said pair of brace members comprising a pair of links, and at least one end of each of said links being secured to one of said guide members, and other brace members terminally secured to said guide members, said other brace members extending in parallel relationship to each other between said guide members.

2. An adjustable tray structure for an automotive vehicle comprising a pair of channel guide members, bracket members secured to guide members for securing said tray structure beneath the instrument panel of the automotive vehicle, a pair of brace members terminally attached to said guide members and extending therebetween, a stop member on one of said brace members, a tray slidably received and carried by said guide members, a stop member carried by said tray for engagement with the stop member on said brace member when said tray is in an extended position, each of said pair of brace members comprising a pair of links, and at least one end of each of said links being secured to one of said guide members, and other brace members terminally secured to said guide members, said other brace members extending in criss-cross relationship to each other between said guide members.

3. An adjustable tray structure for an automotive vehicle comprising a pair of guide members channel-shaped in cross-section, bracket members fixed to said guide members for securing the latter in spaced parallelism beneath the instrument pannel of an automotive vehicle, a pair of brace members terminally attached to said guide members and extending therebetween, a stop member detachably mounted on one of said brace members, a tray slidably received in and carried by said guide members, and a stop member removably mounted on said tray at a predetermined place for engagement with the stop member on said one brace member when said tray is in an open position, said second named stop member being a block having a bolt, and said tray having selectively usable bolt holes at prescribed locations, whereby said block may be positioned in either of said locations at will.

4. A receding type serving tray to be mounted on a normally out-of-the-way position area of an instrument panel comprising a knockdown frame, said frame embodying a pair of spaced parallel guides channel-shaped in cross-section, brackets carried by corresponding end portions of said guide members, said brackets to be detachably secured to an available portion of said instrument panel, a plurality of brace members, all of said brace members being independent parts and being separably bolted at their terminal end portions to complemental predetermined portions of the respective guide members, said guide members and braces being adjustable in relation to each other to make up a frame which is either long or short as existing conditions require, an insertable and removable tray, said tray being of elongated form and being attachable to said guide members either lengthwise or crosswise depending on the requirements of installation, a stop member detachably mounted on a prescribed one of said brace members, said tray having selectively usable bolt holes, and a bolt equipped stop block, the bolt on said stop block being selectively insertable in the desired bolt holes.

CORDELL H. NESBITT.
LESLIE H. RAY, Jr.

REFERENCES CITED

The following references are of record in the file of this patent:

UNITED STATES PATENTS

| Number | Name | Date |
|---|---|---|
| 587,864 | Ryan et al. | Aug. 10, 1897 |
| 2,093,137 | Reeves | Sept. 14, 1937 |
| 2,125,476 | Westrope et al. | Aug. 2, 1938 |
| 2,292,797 | Roberts | Aug. 11, 1942 |
| 2,546,459 | Lee | Mar. 27, 1951 |